United States Patent Office 3,440,243
Patented Apr. 22, 1969

3,440,243
16-SUBSTITUTED ESTRATRIENES AND METHODS OF PREPARING THE SAME
Robert Eugene Schaub, Paramus, N.J., Henry Marcel Kissman, Nanuet, N.Y., and Martin Joseph Weiss, Oradell, N.J., assignors to American Cyanamid Company, Stamford, Conn., a corporation of Maine
No Drawing. Filed June 11, 1963, Ser. No. 286,940
Int. Cl. C07c *169/10, 167/36;* A61k *17/00*
U.S. Cl. 260—239.55
13 Claims This invention relates to new steroid compounds. More particularly, it relates to 16-substituted androstenes, estratrienes and methods of preparing the same.

The novel steroids may be illustrated by the following formula:

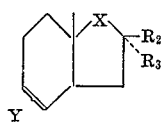

wherein X is selected from the group consisting of >C=O,

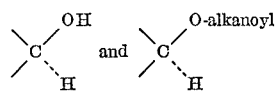

$R_2$ is selected from the group consisting of lower alkoxalyl and cyano, $R_3$ is selected from the group consisting of lower alkyl, lower alkylthio, lower alkylsulfinyl, lower alkylsulfonyl and halogen, $R_2$ and $R_3$ taken together are members of the group consisting of:

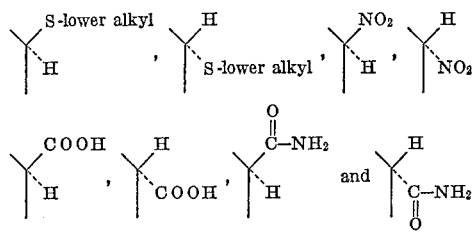

and Y represents a divalent radical of the group consisting of:

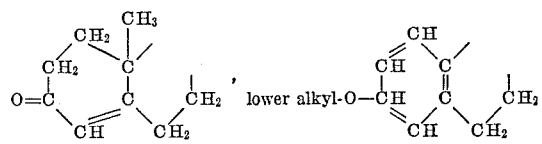

and

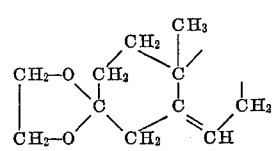

with the understanding that when X is

and $R_2$ or $R_3$ is hydrogen, then the compounds may also exist in their enolic forms:

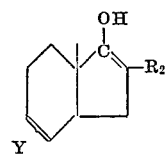

and when $R_2$ and $R_3$ taken together are:

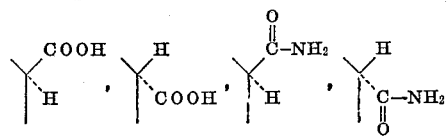

then Y is:

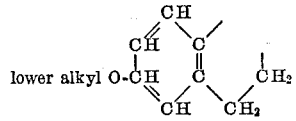

The compounds of the present invention are, in general, white crystalline solids which are soluble in the usual organic solvents and are relatively insoluble in water.

Certain of the novel compounds of this invention are prepared by reaction of the 16-cyano or 16-alkoxalyl derivative of a 3-alkoxy-17-ketoestratriene or androstene in the form of a metal enolate anion, with appropriate reagents such as alkylsulfenyl halides, alkyl halides and halogenating agents such as perchloryl fluoride (for the introduction of fluorine) and chlorine. Reduction of the various 16,16-disubstituted-17-ketones with metal hydrides (e.g., sodium borohydride) well known to those skilled in the art gives the corresponding 17β-hydroxy derivatives. Stepwise oxidation of the alkylthio derivatives with monoperphthalic acid gives the corresponding sulfoxide and sulfone derivatives as shown in the examples hereinafter.

The following equations, using the 16-cyano-17-keto system as an example, illustrate a number of the transformations described hereinafter.

FLOWSHEET I

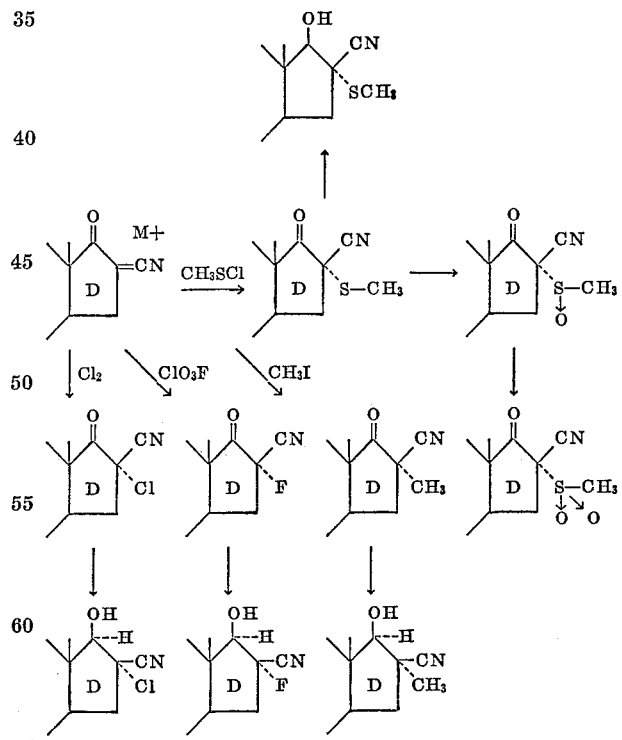

Other novel compounds of this invention are prepared by the following methods. The 16-alkylthio derivatives are prepared by dealkoxalylation under alkaline conditions of a 16-alkylthio-16-alkoxalyl-17-ketone. The 16-nitro derivatives are obtained by treatment of a 17-ketone with potassium t-butoxide and amyl nitrate; and the 16-carboxy and 16-carboxamido derivatives by appropriate alkaline hydrolysis of the corresponding 16-cyano-17-ketone or 16-cyano-17β-hydroxy derivative. Metal hydride (e.g., sodium borohydride) reduction of the 16-substituted-17-keto derivative produces the corresponding 17β-hydroxy derivatives. The formation of these compounds can be illustrated by the following series of equations.

FLOWSHEET II

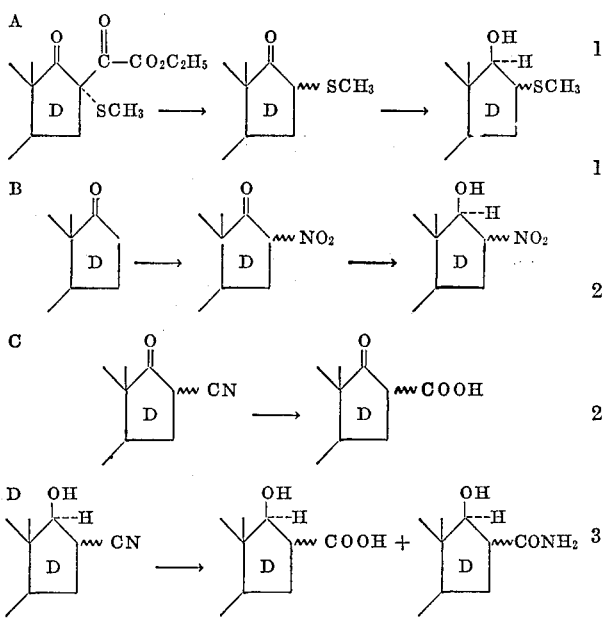

The compounds of this invention are isolated and purified by the usual techniques well known to those skilled in the art, namely, crystallization, recrystallization and chromatography.

The 16β-position is assigned to $R_2$ and 16α-position to $R_3$ in the general formula on the basis of the best evidence presently available, the present concepts of organic theory, in particular the "Rule of the Rear," and by analogy to the known stereochemical outcome of similar reactions at the $C_{16}$ position. On a similar basis, including an analysis of infrared, ultraviolet and nuclear magnetic resonance data, the 17β-position is assigned to the hydroxy group obtained on reduction of the 17-keto function and the position of the $C_{16}$-substituent in the monosubstituted derivatives is determined. These assignments of configuration are made in order to provide a more definitive description of this invention. However, it should be understood that this specification will in no way be defective if it should later be shown that these compounds have a configuration opposite from that presently deducible.

The estratriene derivatives of the present invention have estrogenic activity and can be used in estrogen-replacement therapy, and as agents for the lowering of blood cholesterol levels. The androstene derivatives of this invention have androgenic activity and may be used in androgen-replacement therapy and as anabolic agents. The compounds of this invention also inhibit the growth of certain microorganisms. When tested by agar dilution techniques, the compounds inhibit growth of such fungi as *Trichophyton mentogrophytes* and *Microsporum gypseum*. The present compounds therefore are useful as fungicides.

The following examples describe in greater particularity the preparation of representative estratrienes and androstenes of the present invention.

EXAMPLE I

Preparation of 16β-cyano-3-methoxy-16α-methyl-17-oxo-1,3,5(10)-estratriene

To a solution of 500 mg. of 16β-cyano-3-methoxy-17-oxo-1,3,5(10)-estratriene [J. Org. Chem., 27, 3168 (1962)] in 25 ml. of reagent acetone, through which nitrogen is bubbled, is added 1 g. of anhydrous potassium carbonate and 2 ml. of methyl iodide. The mixture is allowed to stir under a nitrogen atmosphere for 2 days after which time an additional 2 ml. of methyl iodide is added and stirring is continued for an additional 5 days. The mixture is filtered and the mother liquor is evaporated to dryness. The residue is recrystallized from acetone-water to give 442 mg. (85%) of product, melting point 173°–176° C. Recrystallization from acetone-petroleum ether and then from ether-petroleum ether gives white crystals, melting point 185°–186° C., $[\alpha]_D^{25}$ +108° (0.58% in $CHCl_3$);

$\lambda_{max.}^{MeOH}$ 221 mμ (ε 9400), 279 mμ (ε 2100), 288 mμ (ε 1940); $\lambda_{max.}^{KBr}$ 4.48, 5.68, 6.18, 6.34, 6.66, 6.86, 7.96μ.

EXAMPLE II

Preparation of 3-ethylenedioxy-16β-cyano-16α-methyl-17-oxo-5-androstene

Treatment of 16-cyano-3-ethylenedioxy-17-oxo-5-androstene [J. Org. Chem., 27, 3168 (1962)] with methyl iodide in the manner of Example I is productive of 3-ethylenedioxy-16β-cyano-16α-methyl-17-oxo-5-androstene.

EXAMPLE III

Preparation of 16β-cyano-16α-fluoro-3-methoxy-17-oxo-1,3,5(10)-estratriene

Perchloryl fluoride is bubbled briskly into a cold (−4° C.) stirred solution of 16β-cyano-3-methoxy-17-oxo-1,3,5(10)-estratriene and 3.3 ml. of 1 N methanolic sodium methoxide in 20 ml. of methanol until the solution turns neutral (4 minutes). After flushing with nitrogen, the solution is concentrated under reduced pressure to a small volume. It is then diluted with water and extracted twice with methylene chloride. The combined extracts are washed with water, dried with anhydrous magnesium sulfate and evaporated to dryness. Recrystallization of the residue from ether-petroleum ether gives 308 mg. (58%) of product, melting point 153°–155° C. Recrystallization from the same solvent pair furnishes white crystals, melting point 154°–155° C., $[\alpha]_D^{25}$ +185° (1.1% in $CHCl_3$);

$\lambda_{max.}^{MeOH}$ 222 mμ (ε 9000), 279 mμ (ε 1960) and 288 mμ (ε 1960); $\lambda_{max.}^{KBr}$ 4.45, 5.70, 6.21, 6.36, 6.69, 8.00μ

EXAMPLE IV

Preparation of 16β-cyano-3-ethylenedioxy-16α-fluoro-17-oxo-5-androstene

Treatment of 16-cyano-3-ethylenedioxy-17-oxo-5-androstene with perchloryl fluoride in the manner of Example III is productive of 16β-cyano-3-ethylenedioxy-16α-fluoro-17-oxo-5-androstene.

EXAMPLE V

Preparation of 16β-cyano-3-methoxy-16α-methylthio-1,3,5(10)-estratrien-17-one

16β-cyano-3-methoxy-1,3,5-estratrien-17-one (1.54 mg., 5 mmoles) is dissolved in 20 ml. of methanol and 5 ml. of a 1 N methanolic sodium methoxide solution. The yellow solution is evaporated at 40° C. and the residue is evaporated with 10 ml. of dry dioxane to remove traces of methanol. The residue is mixed with 30 ml. of dioxane and to the yellow suspension is added 470 mg. (theory 450 mg.) of methanesulfenyl chloride. Most of the solid goes into solution within a few minutes and the faintly yellow solution is evaporated at 40° C. The residue is dissolved in benzene and the solution is washed with water till neutral and is dried, decolorized and evaporated. The residue is crystallized from ether to give 755 mg., melting point 113°–115° C.

EXAMPLE VI

Preparation of 16β-cyano-3-methoxy-16α-methylsulfinyl-17-oxo-1,3,5(10)-estratriene To a solution of 300 mg. of 16β-cyano-3-methoxy-16α-methylthio-17-oxo-1,3,5(10)-estratriene (Example V) in 7.5 ml. of methylene chloride is added 1.05 mole equivalents of ethereal monoperphthalic acid. The reaction mixture, protected from moisture, is allowed to stand at room temperature for 24 hours, during which period perphthalic acid separates. The phthalic acid is separated by filtration. The filtrate is washed with dilute sodium carbonate solution, water, dried with anhydrous magnesium sulfate and evaporated to dryness. Trituration of the residue with petroleum ether and filtration gives 254 mg. (81%) of product, melting point 148°–150° C. (gas). Recrystallization from methylene chloride-ether gives white crystals, melting point 149°–151° C. (gas), $[\alpha]_D^{25}$ +125° (0.97% in CHCl$_3$);

$\lambda_{max.}^{MeOH}$ 221 m$\mu$ ($\epsilon$ 10,800), 279 m$\mu$ ($\epsilon$ 2040) and 288 m$\mu$ ($\epsilon$ 2040); $\lambda_{max.}^{KBr}$ 4.45, 5.70, 6.19, 6.32, 6.65, 7.98, 9.19$\mu$

EXAMPLE VII

Preparation of 16β-cyano-3-methoxy-16α-methylsulfonyl-17-oxo-1,3,5(10)-estratriene 16β-cyano-3-methoxy-16α-methylsulfinyl-17-oxo-1,3,5(10)-estratriene (Example VI) (110 mg.) is treated with monoperphthalic acid according to the procedure described above for the sulfoxide preparation (Example VI) except that the time is extended to 48 hours. Evaporation of the methylene chloride solvent gives a semi-solid which is recrystallized twice from acetone-petroleum ether to furnish 70 mg. (61%) of product, melting point 164°–166° C. (gas);

$\lambda_{max.}^{MeOH}$ 222 m$\mu$ ($\epsilon$ 4300), 279 m$\mu$ ($\epsilon$ 2130) and 288 m$\mu$ ($\epsilon$ 2130); $\lambda_{max.}^{KBr}$ 4.46, 5.67, 6.18, 6.63, 6.65, 7.50, 7.98, 8.49$\mu$

EXAMPLE VIII

Preparation of 16β-cyano-17β-hydroxy-3-methoxy-16α-methylthio-1,3,5(10)-estratriene To a solution of 200 mg. of 16β-cyano-3-methoxy-16α-methylthio-17-oxo-1,3,5(10)-estratriene (Example V) in 20 ml. of absolute alcohol is added 200 mg. of sodium borohydride and the resulting suspension is stirred at room temperature for one hour. Acetic acid is added carefully and then water. The resulting solution is evaporated to near dryness under reduced pressure and the wet residue is extracted twice with methylene chloride. The combined extracts are washed with water, dried with anhydrous magnesium sulfate and evaporated to dryness. Recrystallization of the residue from ether-petroleum ether furnishes 140 mg. (70%) of product, melting point 185°–190° C. Recrystallization from methylene chloride-ether-petroleum ether gives white crystals, melting point 190°–193° C., $[\alpha]_D^{25}$ +59° (0.29% in CHCl$_3$);

$\lambda_{max.}^{MeOH}$ 220 m$\mu$ ($\epsilon$ 8600), 279 m$\mu$ ($\epsilon$ 1960), 288 m$\mu$ ($\epsilon$ 1880); $\lambda_{max.}^{KBr}$ 2.90, 4.46, 6.18, 6.38, 6.66, 7.98$\mu$

EXAMPLE IX

Preparation of 16β-cyano-3-methoxy-16α-methylthio-17β-propionyloxy-1,3,5(10)-estratriene Treatment of 16β-cyano-17β-hydroxy-3-methoxy-16α-methylthio-1,3,5(10)-estratriene (Example VI) with propionic anhydride in the manner of Example XXXI is productive of 16β-cyano-3-methoxy-16α-methylthio-17β-propionyloxy-1,3,5(10)-estratriene.

EXAMPLE X

Preparation of 16β-cyano-17β-hydroxy-3-methoxy-16α-methyl-1,3,5(10)-estratriene

Treatment of 200 mg. of 16β-cyano-3-methoxy-16α-methyl-17-oxo-1,3,5(10)-estratriene (Example I) in 20 ml. of purified tetrahydrofuran for 3 hours according to the procedure described above for the preparation of 16β-cyano-17β-hydroxy-3-methoxy-16α-methylthio-1,3,5(10)-estratriene (Example VIII) gives 150 mg. (75%) of product, melting point 205°–207° C. Recrystallization from methylene chloride-ether gives white crystals, melting point 208°–210° C. $[\alpha]_D^{25}$ +51.5° (0.53% in CHCl$_3$);

$\lambda_{max.}^{MeOH}$ 220 m$\mu$ ($\epsilon$ 8000), 279 m$\mu$ ($\epsilon$ 1870), 288 m$\mu$ ($\epsilon$ 1790); $\lambda_{max.}^{KBr}$ 2.90, 4.96, 6.19, 6.34, 6.66, 7.97$\mu$

EXAMPLE XI

Preparation of 16β-cyano-3-methoxy-16α-methyl-17β-octanoyloxy-1,3,5(10)-estratriene Treatment of 16β-cyano-17β-hydroxy-3-methoxy-16α-methyl-1,3,5(10)-estratriene (Example VII) with octanoic acid anhyride in the manner of Example XXXI is productive of 16β-cyano-3-methoxy-16α-methyl-17β-octanoyloxy-1,3,5(10)-estratriene.

EXAMPLE XII

Preparation of 3-ethylenedioxy-16β-cyano-17β-hydroxy-16α-methyl-5-androstene

Treatment of 3-ethylenedioxy-16β-cyano-16α-methyl-17-oxo-5-androstene (Example II) with sodium borohydride in the manner of Example VIII is productive of 3-ethylenedioxy-16β-cyano-17β-hydroxy-16α-methyl-5-androstene.

EXAMPLE XIII

Preparation of 16α-chloro-16β-cyano-3-methoxy-17-oxo-1,3,5(10)-estratriene

To a stirred suspension of 500 mg. of 16β-cyano-3-methoxy17-oxo-1,3,5(10)-estratriene and 500 mg. of anhydrous potassium carbonate in 25 ml. of reagent carbon tetrachloride at —5° C. is added 1.3 ml. of a solution of 4.1 g. of chlorine in 39 ml. of carbon tetrachloride. The mixture is stirred at —5° C. for approximately 24 hours. After filtration, the mother liquor is washed with water, dried with anhydrous magnesium sulfate and evaporated to dryness under reduced pressure to give 400 mg. of product, $\lambda_{max.}^{MeOH}$ 220 m$\mu$ ($\epsilon$ 9600), 281 m$\mu$ ($\epsilon$ 2000) and 288 m$\mu$ ($\epsilon$ 1900); $\lambda_{max.}^{KBr}$ 5.70, 6.22, 6.35, 6.69 and 8.00$\mu$

EXAMPLE XIV

Preparation of 16-ethoxalyl-3-methoxy-1,3,5(10)-estratrien-17-one (enol form)

To a solution of 1.14 g. (4 mmoles) or 3-methoxy-1,3,5(10)-estratrien-17-one in 120 ml. of anhydrous benzene is added 1.8 ml. ethyl oxalate and 0.42 g. of 50% sodium hydride oil dispersion. The reaction is started by the addition of a few drops of ethanol and the mixture is stirred under nitrogen for 16 hours. The yellow suspension is extracted several times with cold 1% aqueous potassium hydroxide solution and the extracts are added to aqueous 30% sodium dihydrogen phosphate solution. This mixture in turn is extracted with several portions of chloroform until these extracts no longer give a positive enol test with ferric chloride solution. The combined chloroform extracts are washed with water, dried and evaporated. The residue is crystallized from ether to give 1.16 g. of a solid (strong positive enol test), melting point 140°–146° C. A sample recrystallized from acetone-hexane has a melting point 141–145°, $[\alpha]_D$ +63.4° (c., 104);

$\lambda_{max.}^{CH_3OH}$ 285 m$\mu$ ($\epsilon$ 9800 in acid), 298 m$\mu$ ($\epsilon$ 11,600 in methanol), 302 m$\mu$ ($\epsilon$ 20,600 in base); $\lambda_{max.}^{KBr}$ 5.74$\mu$ (s.); 5.96$\mu$ (s.); 6.21$\mu$ (s.)

EXAMPLE XV

Preparation of 16β-ethoxalyl-3-methoxy-16α-methylthio-1,3,5(10)-estratrien-17-one To a suspension of 1.72 g. (5 mmoles) of the ethoxalyl derivative (Example XIV) in 10 ml. of methanol is added 5 ml. of 1 N methanolic sodium methoxide solution and the resulting yellow solution is evaporated and re-evaporated with 20 ml. of dry dioxane. The residue is dissolved in 35 ml. of dioxane and 453 mg. (5 mmoles+ 10%) of methanesulfenyl chloride is added. The mixture turns colorless after a few minutes (negative ferric chloride enol test). It is evaporated and the residue is mixed with 50 ml. of benzene and aqueous sodium bicarbonate solution. The layers are separated and the organic phase is washed with water, dried and evaporated. The residue is crystallized from ether to give 1 g. (47%) of white solid with melting point 135°–138° C. A sample recrystallized twice from ether has a melting point 130°–133° C., $[\alpha]_D$ +21.5° (c., 0.976);

$\lambda_{max.}^{KBr}$ 5.70μ (shoulder, s.); 5.72μ (s.); 5.83μ (s.)

EXAMPLE XVI

Preparation of 3-methoxy-16α-nitroestra-1,3,5(10)-trien-17-one and 3-methoxy-16β-nitroestra-1,3,5(10)-trien-17-one To a stirred purified tetrahydrofuran (10 ml.) solution containing 1.3 g. of freshly sublimed potassium t-butoxide and cooled to −30° C. is added a suspension of estrone methyl ether (2.0 g.) in tetrahydrofuran (40 ml.). To the resulting solution is added dropwise a solution of amyl nitrate (4 ml.) in tetrahydrofuran (6 ml.). The temperature is maintained at −30° for 30 minutes and the solution is then removed from the cooling bath and is allowed to warm to room temperature for about 45 minutes, during which period a voluminous precipitate separates. The reaction mixture is then acidified with 2 N hydrochloric acid. Water is added and the mixture is extracted twice with methylene chloride. The combined extracts are washed with water, dried and evaporated to dryness. Recrystallization of the residue from methylene chloride-ether gives 1.82 g. of product, melting point 180–183° C., dec., $[\alpha]_D^{25}$ +72.3° (0.54% in CHCl$_3$);

$\lambda_{max.}^{CH_3OH}$ 280 mμ (ε 2800); 288 mμ (ε 3130) and 335 mμ (ε 6260); $\lambda_{max.}^{(CH_3)_2SO}$ 280 mμ (ε 2820), 288 mμ (ε 2790), 343 mμ (ε 5740)

no significant absorption in chloroform from 295 mμ to 400 mμ (absence of enol form);

$\lambda_{max.}^{0.1NHCl}$ 280 mμ (ε 2300) and 286 mμ (ε 2100), $\lambda_{max.}^{0.1NNaOH}$ 288 mμ (shoulder) (ε 4900) and 325 mμ (ε 14,900); $\lambda_{max.}^{CHCl_3}$ 5.67, 6.20, 6.42, 6.49, 6.81, 6.86, 7.38μ no absorption below 3.30μ; NMR (at 60 mgc., in COCl$_3$, (CH$_3$)$_4$Si internal standard): 61, 68 c.p.s. (C$_{18}$-CH$_3$ peaks of epimeric nitro derivatives, total intensity equal to 3 protons), 307 c.p.s. (center of complex 1 proton multiplet).

EXAMPLE XVII

Preparation of 16β-nitroestradiol 3-methyl ether-(17β-hyroxy-3-methoxy-16β-nitroestra-1,3,5(10)-triene)

A suspension of 300 mg. of 16α and β-nitroestrone-3-methyl ether (Example XVI) and 100 mg. of lithium boro-hydride in 25 ml. of purified tetrahydrofuran is stirred at room temperature for 20 hours. Excess hydride is then destroyed by the addition of about 2 ml. of acetic acid followed by ice-water until gas evolution ceases. The mixture is concentrated to a small volume on a 50° bath and the resulting solution is extracted several times with methylene chloride. The combined extracts are washed with water, dried and evaporated to dryness. The residue (160 mg.) is subjected to partition chromatography on diatomaceous earth. The system n-heptane-methanol is used. The column is packed with 80 g. of diatomaceous earth and the recording spectrophotometer is set at 280 mμ. The first 400 ml. of effluent contains a negligible amount of material; the next 260 ml. of effluent contains the major peak which on evaporation affords 76 mg. of crude material. Two recrystallizations from acetone-petroleum ether gives 52 mg. of product, melting point 102–104° C., $[\alpha]_D^{25}$ +80° (1.0%)

$\lambda_{max.}$ 279 mμ (ε 3200), 287 mμ (ε 2150), $\lambda_{max.}^{KBr}$ 2.78, 2.91, 6.18, 6.45, 7.23, 9.65μ

EXAMPLE XVIII

Preparation of 17β-acetoxy-3-methoxy-16β-nitroestra-1,3,5(10)-triene

Treatment of 16β-nitroestradiol-3-methyl ether (Example XVII) with acetic anhydride in pyridine solution in the manner of Example XXXI is productive of 17β-acetoxy-3-methoxy-16α-nitroestra-1,3,5(10)-triene.

EXAMPLE XIX

Preparation of 3-ethylenedioxy-16β-nitroandrost-5-en-17-one and 3-ethylenedioxy-16α-nitroandrost-5-en-17-one Treatment of 3-ethylenedioxyandrost-5-en-17-one (2 g.) [J. Org. Chem. 27, 3168 (1962)] in a solution of 30 ml. of tetrahydrofuran containing 1.31 g. of sublimed potassium tertiary butoxide with a solution of 4.4 ml. of butyl nitrate in 10 ml. of tetrahydrofuran in the manner described above for the preparation of 16-nitroestrone-3-methyl ether (Example XVI) gives 1.27 g. (56%) of product with melting point 192°–195° C., dec. In a pilot run, the yield is 460 mg. (60%), melting point 186°–188° C., dec. Several recrystallizations from methylene chloride-ether give white crystals, melting point 192°–195° C., dec., $[\alpha]_D^{26}$ +3.3° (1.23%);

$\lambda_{max.}^{MeOH}$ 230 mμ (ε 4130), 240 mμ (shoulder) (ε 3680), and 335 mμ (ε 5500); $\lambda_{max.}^{CHCl_3}$ 300 mμ (ε 486); $\lambda_{max.}^{CH_3OH}$ 345 mμ (ε 6580); $\lambda_{max.}^{0.1NHCl}$ 230 mμ (ε 3680) and 240 mμ (ε 3680); $\lambda_{max.}^{0.1NNaOH}$ 230 mμ (ε 6300), 235 mμ (ε 5650), and 325 mμ (ε 15,000); $\lambda_{max.}^{CHCl_3}$ 5.69 (s.), 5.98 (μ), 6.45, 7.40μ no bands below 3.4μ; NMR (at 60 mgc., in COCl$_3$, (CH$_3$)$_4$Si internal standard): 61, 68 c.p.s. (C$_{18}$-CH$_3$ of epimeric nitro derivatives, total intensity 3 protons), 66 c.p.s. (CH$_{19}$-CH$_3$, total intensity 3 protons), 307 c.p.s. (center of complex multiplet).

EXAMPLE XX

Preparation of 16β-nitroandrost-4-ene-3,17-dione and 16α-nitroandrost-4-ene-3,17-dione Treatment of 3-ethylenedioxy-16β-nitroandrost-5-en-17-one and 3-ethylenedioxy-16α-nitroandrost-5-en-17-one (Example XIX) with .8% aqueous sulfuric acid in the manner of Example XXXVI is productive of 16β-nitroandrost-4-ene-3,17-dione and 16α-nitroandrost-4-ene-3,17-dione.

EXAMPLE XXI

Preparation of 3-methoxy-16α-methylthio-1,3,5(10)-estratrien-17-one and 3-methoxy-16β-methylthio-1,3,5-estratrien-17-one A solution of 200 mg. (0.46 mmole) of 16β-ethoxalyl-3-methoxy-16α-methylthio-1,3,5-estratrien-17-one (Example XV) in 12 ml. of methanol is refluxed with 400 mg. of potassium acetate for one hour and evaporated. The residue is dissolved in water-methylene chloride and the organic phase is washed with water, dried and evaporated. The residue is crystallized from ether to give 139 mg. (90%) of the epimeric mixture, melting point 112°–117° C. A sample recrystallized from ether with activated charcoal has melting point 117°–123° C., NMR (at 60 mgc. in COCl$_3$, (CH$_3$)$_4$Si internal standard): 9.05γ, 8.87γ (CH$_{18}$-CH$_3$ of epimers), 7.67γ, 7.70γ (epimeric C$_{16}$-S-CH$_3$ groups).

EXAMPLE XXII

Preparation of 17β-hydroxy-3-methoxy-16β-methylthio-1,3,5(10)-estratriene

To a solution of 340 mg. (1.03 mmole) of the 17-keto derivative (Example XXI) in 20 ml. of pure, dry tetrahydrofuran is added 100 mg. of lithium borohydride and the stirred mixture is heated under reflux for 3 hours. Excess hydride is decomposed by the dropwise addition of acetic acid, followed by water. The mixture is evaporated to a small volume and is extracted with methylene chloride. The extracts are washed with water, dried and evaporated to yield a solid which is recrystallized from ether-hexane, 306 mg. (89%), melting point 105°–107° C. A sample twice recrystallized from ether-pentane gives melting point 111°–114° C., $[\alpha]_D$ +36.3° (c., 1.13); no infrared absorption in the carbonyl region.

EXAMPLE XXIII

Preparation of 3-ethylenedioxy-16β-ethoxalyl-16α-methylthio-5-androsten-17-one

To a suspension of 3.6 g. (8.38 mmoles) of 3-ethylenedioxy-16-ethoxalyl-5-androsten-17-one [J. Org. Chem., 26, 973 (1961)] in 20 ml. of methanol is added 8.5 ml. of a 1 N methanolic sodium methoxide solution and the resulting yellow solution is evaporated at 40° C. The residue is evaporated once with 20 ml. of dioxane and is then dissolved in 30 ml. of dioxane. Methanesulfenyl chloride (759 mg. 8.38 mmoles+10%) is added and the mixture is stirred for a few minutes by which time the color is discharged (negative ferric chloride enol test). The mixture is evaporated and the residue is taken up in chloroform and is washed with sodium bicarbonate solution (emulsion) and finally with water. The chloroform solution is dried quickly over magnesium sulfate and is evaporated. The crystalline residue is collected with ether to give 3.3 g. (83% crude yield), melting point 159°–166° C. A sample recrystallized from ether gives melting point 172°–173° C., $[\alpha]_D$ +93.8° (c., 0.938);

$$\lambda_{max.}^{KBr} 5.69\mu \text{ (s.), } 5.75\mu \text{ (s.), } 5.83\mu \text{ (s.)}$$

EXAMPLE XXIV

Preparation of 3-ethylenedioxy-16α-methylthio-5-androsten-17-one and 3-ethylenedioxy-16β-methylthio-5(6)-androsten-17-one A mixture of 1.904 g. (4 mmoles) of the methylthio ethoxalyl derivative (Example XXIII), 50 ml. of methanol and 2 g. of potassium acetate is heated under reflux for 1¾ hours. The solution is evaporated partially and the mixture is dissolved in methylene chloride-water. The organic phase is separated, washed with water, dried over sodium sulfate, and evaporated. The residue is crystallized from ether-hexane to give 1.4 g. (93%), melting point 143°–150° C. A sample recrystallized twice from ether gives melting point 155–167° C., $[\alpha]_D$ +18.1° (c., 0.83)

$$\lambda_{max.}^{KBr} 5.74\mu \text{ (s.)}$$

EXAMPLE XXV

Preparation of 3-ethylenedioxy-17β-hydroxy-16α-methylthio-5-androstene and 3-ethylenedioxy-17β-hydroxy-16β-methylthio-5-androstene A solution of 676 mg. (1.79 mmoles) of the 17-keto derivative (Example XXIV) is reduced with 180 mg. of lithium borohydride in 36 ml. tetrahydrofuran at room temperature for 5 hours. Excess hydride is destroyed with acetic acid and water, and the mixture is partially evaporated. Methylene chloride is added and the mixture is washed several times with water and is dried and evaporated. The residue is crystallized from ether and there is obtained in several fractions 560 mg. with melting point 185–197° C., no infrared absorption in the carbonyl region. Recrystallization from ether-methylene chloride (two times) gives the 16β-methylthio derivative (157 mg.), melting point 208°–212° C.

From the ether crystallization mother liquor there is obtained the 16α-methylthio epimer, which after recrystallization from ether-hexane melts at 150°–160° C. (75 mg.).

EXAMPLE XXVI

Preparation of 17β-hydroxy-16β-methylthio-4-androsten-3-one

A solution of 317 mg. (0.84 mmole) of 3-ethylenedioxy-17β-hydroxy-16β-methylthio-5-androstene (Example XXV) in 20 ml. of methanol containing 0.9 ml. 8% aqueous sulfuric acid is heated under reflux for one hour, and is then neutralized with anion exchange resin (OH form). The resin is removed by filtration and is washed well with methanol. Filtrate and washings are combined and evaporated. The residue is crystallized from ether containing a small amount of methylene chloride to give 180 mg. (64%), melting point 139°–143° C. A sample recrystallized several times from ether has melting point 148°–150° C., $[\alpha]_D$ +41° (c., 1.07);

$$\lambda_{max.}^{KBr} 240 \text{ m}\mu \text{ } (\epsilon \text{ } 16,700), 6.02\mu \text{ (s.)}$$

EXAMPLE XXVII

Preparation of 16β-cyano-16α-methylandrost-4-ene-3,17-dione

Hydrolysis of 3-ethylenedioxy-16β-cyano-16α-methyl-17-oxo-5-androstene (Example II) with sulfuric acid in the manner of Example XXVI produces 16β-cyano-16α-methylandrost-4-ene-3,17-dione.

EXAMPLE XVIII

Preparation of 16β-cyano-16α-fluoroandrost-4-ene-3,17-dione

Hydrolysis of 16β-cyano-3-ethylenedioxy-16α-fluoro-17-oxo-5-androstene (Example IV) with sulfuric acid in the manner of Example XXVII gives 16β-cyano-16α-fluoroandrost-4-ene-3,17-dione.

EXAMPLE XXIX

Preparation of 16β-cyano-17β-hydroxy-16α-methylandrost-4-en-3-one

Hydrolysis of 3-ethylenedioxy-16β-cyano-17β-hydroxy-16α-methyl-5-androstene (Example XII) in the manner of Example XXVI produces 16β-cyano-17β-hydroxy-16α-methylandrost-4-en-3-one.

EXAMPLE XXX

Preparation of 17β-hydroxy-16α-methylthio-4-androsten-3-one

Treatment of 3-ethylenedioxy-17β-hydroxy-16α-methylthio-5-androstene (Example XXV) with 8% aqueous sulfuric acid in the manner of Example XXVI is productive of 17β-hydroxy-16α-methylthio-4-androsten-3-one.

EXAMPLE XXXI

Preparation of 16β-methylthio-17β-propionyloxy-4-androsten-3-one

A solution of 17β-hydroxy-16β-methylthio-4-androsten-3-one (Example XXVI) and 1 ml. of propionic anhydride in 3 ml. of reagent pyridine is allowed to stand at room temperature for about 40 hours. After dilution with water, the crystalline material is collected by filtration to give the product, melting point 135–137° C., after recrystallizattion from ether-petroleum ether.

EXAMPLE XXXII

Preparation of 16α-methylthio-17β-propionyloxy-4-androstene-3-one

Treatment of 17β-hydroxy-16α-methylthio-4-androsten-3-one (Example XXX) with propionic anhydride in the manner of Example XXXI is productive of 16α-methylthio-17β-propionyloxy-4-androsten-3-one.

EXAMPLE XXXIII

Preparation of 16β-methylthio-17β-octanoyloxy-4-androsten-3-one

Treatment of 17β-hydroxy-16β-methylthio-4-androsten-3-one (Example XXVI) with octanoic acid anhydride in the manner of Example XXXI is productive of 16β-methylthio-17β-octanoyloxy-4-androsten-3-one.

EXAMPLE XXXIV

Preparation of 16α-methylthio-17β-octanoyloxy-4-androsten-3-one

Treatment of 17β-hydroxy-16α-methylthio-4-androsten-3-one (Example XXX) with octanoic acid anhydride in the manner of Example XXXI furnishes 16α-methylthio-17β-octanoyloxy-4-androsten-3-one.

EXAMPLE XXXV

Preparation of 16β-carbamoyl-3-methoxy-17-oxo-1,3,5(10)-estratriene

A solution of 600 mg. of 16-cyano-3-methoxy-17-oxo-1,3,5(10)-estratriene in 20 ml. of absolute alcohol and 10 ml. of 10% aqueous potassium hydroxide solution is heated at the reflux temperature for 3 hours; solution being complete at the boiling point. After cooling the solution is diluted with water, acidified with 20% hydrochloric acid and filtered to give 341 mg. of product, melting point 210–220° C., dec. Recrystallization from acetone-petroleum ether furnishes white crystals, melting point 216–218° C., dec., $[\alpha]_D^{25}$ +77° (0.79% in $CHCl_3$);

$\lambda_{max.}^{CH_3OH}$ 221 mμ (ε 9000), 278 mμ (ε 2120) and 288 mμ (ε 2000); $\lambda_{max.}^{KBr}$ 2.91, 3.00, 3.13, 5.86, 6.00, 6.20, 6.63, 7.97, 9.65μ.

EXAMPLE XXXVI

Preparation of 16β-carboxy-3-methoxy-17-oxo-1,3,5(10)-estratriene

Treatment of 600 mg. of 16-cyano-3methoxy-17-oxo-1,3,5(10)-estratriene in 20 ml. of absolute alcohol and 10 ml. of 10% aqueous potassium hydroxide in the manner described above for the preparation of 16β-carbamoyl-3-methoxy-17-oxo-1,3,5(10)-estratriene (Example XXXV) except that the time is increased to 18 hours, furnishes 430 mg. of product, melting point 252–255° C., dec. Recrystallization from acetone-petroleum ether gives white crystals, melting point 254–256° C., dec., $[\alpha]_D^{25}$ +91° (0.96% in $CH_3OH$);

$\lambda_{max.}^{CH_3OH}$ 222 mμ (ε 8200), 278 mμ (ε 1970) and 288 mμ (ε 1970); $\lambda_{max.}^{KBr}$ 3.40 (broad), 5.84 (broad), 6.19, 6.34, 6.64, 6.81, 7.98, 9.61, 10.38 (broad) μ

EXAMPLE XXXVII

Preparation of 16β-carbamoyl-17β-hydroxy-3-methoxy-1,3,5(10) - estratriene and 16β-carboxy-17β-hydroxy-3-methoxy-1,3,5(10)-estratriene A solution of 1 g. of 16β-cyano-17β-hydroxy-3-methoxy-1,3,5(10)-estratriene in 100 ml. of absolute alcohol, containing a solution of 6 g. of potassium hydroxide in 20 ml. of water is heated at the reflux temperature for 3 hours. The cooled solution is acidified with dilute hydrochloric acid, filtered and concentrated to a small volume under reduced pressure. Dilution with water and filtration gives 990 mg. of a crystalline mixture of the acid and amide. The material is dissolved in 20 ml. of 80% aqueous methanol and added at the top of a chromatographic column containing about 10 g. of wet Amberlite IRA–400 (OH form). The column is washed with 125 ml. of 80% aqueous methanol to remove the amide. The eluant is concentrated to a small volume under reduced pressure, water is added and the solid is collected to give 305 mg. (30%) of 16β - carbamoyl - 17β - hydroxy - 3-methoxy-1,3,5(10)-estratriene, melting point 200–205° C. Recrystallization from acetone raises the melting point to 226–228° C., $[\alpha]_D^{25}$ +88° (0.53% in $CHCl_3$);

$\lambda_{max.}^{MeOH}$ 222 mμ (ε 8900), 279 mμ (ε 1980) and 288 mμ (ε 1980); $\lambda_{max.}^{KBr}$ 2.89, 2.94, 2.99, 3.13, 6.04, 6.21, 6.31, 6.67, 8.12, 9.66μ.

The column then is eluted with approximately 1 N hydrochloric acid in 80% aqueous methanol (150 ml.). The eluant is concentrated to a small volume with anhydrous magnesium sulfate and evaporated to dryness to furnish 135 mg. (13%) of 16β-carboxy-17β-hydroxy-3-methoxy-1,3,5(10)-estratriene, melting point 180–185° C. Two recrystallizations from acetone-petroleum ether gives white crystals, melting point 188°–190° C., $[\alpha]_D^{25}$ +81° (0.63% in $CHCl_3$);

$\lambda_{max.}^{MeOH}$ 222 mμ (ε 8800), 279 mμ (ε 1830) and 288 mμ (ε 1830); $\lambda_{max.}^{KBr}$ 2.96, 3.41, 3.75, 5.85 (broad), 6.18, 6.32, 6.64, 8.06, 9.64μ

We claim:

1. A compound of the formula:

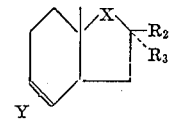

wherein X is a divalent radical selected from the group consisting of:

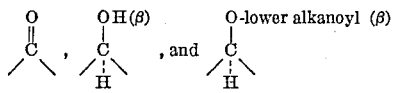

Y is a divalent radical selected from the group consisting of:

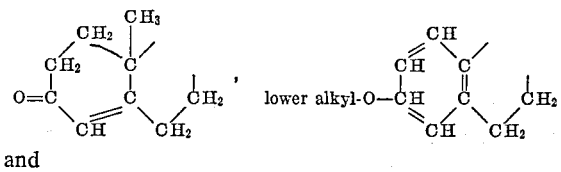

and

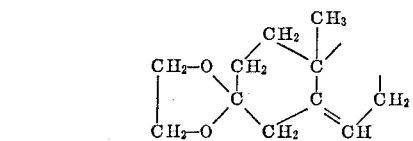

$R_2$ is selected from the group consisting of lower alkoxalyl and cyano, $R_3$ is selected from the group consisting of lower alkylthio, lower alkylsulfinyl, lower alkylsulfonyl and halogen, $R_2$ and $R_3$ taken together are members of the group consisting of;

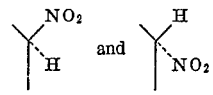

2. The compound 16β-cyano-16α-fluoro-3-methoxy-17-oxo-1,3,5(10)-estratriene.

3. The compound 16β-cyano-3-methoxy-16α-methylthio-1,3,5(10)-estratrien-17-one.

4. The compound 16β-cyano-3-methoxy-16α-(methylsulfinyl)-17-oxo-1,3,5(10)-estratriene.

5. The compound 16β-cyano-17β-hydroxy-3-methoxy-16α-(methylthio)-1,3,5(10)-estratriene.

6. The compound 16α-chloro-16β-cyano-3-methoxy-17-oxo-1,3,5(10)-estratriene.

7. The compound 16β - ethoxalyl - 3 - methoxy - 16α-methylthio-1,3,5(10)-estratrien-17-one.

8. The compound 3-methoxy-16β-nitroestra-1,3,5(10)-trien-17-one.

9. The compound 3-ethylenedioxy-16β-nitroandrost-5-en-17-one.

10. The compound 16β-nitroandrost-4-ene-3,17-dione.

11. The compound 16β - carbamoyl - 17β - hydroxy-3-methoxy-1,3,5(10)-estratriene.

12. The compound 16β - carboxy - 17β - hydroxy - 3-methoxy-1,3,5(10)-estratriene.

13. A process for the preparation of 16-nitro-17-keto androstenes and estratrienes which comprises treating the corresponding 17-keto steroid with an alkali metal alkoxide and an alkyl nitrate in an anhydrous solvent.

References Cited

UNITED STATES PATENTS 3,264,286  8/1966  Foell et al. _____ 260—239.5

ELBERT ROBERTS, *Primary Examiner.*

U.S. Cl. X.R.

260—397.1, 397.3, 397.4, 397.5, 999